June 10, 1969 P. L. JACHIM 3,449,513

DUAL COMPLEMENTARY GATE KEYED AUTOMATIC GAIN CONTROL CIRCUIT

Filed Feb. 12, 1968

Inventor
PAUL LAWRENCE JACHIM

BY Mueller, Aichele & Rauner

ATTYS.

United States Patent Office 3,449,513

Patented June 10, 1969

3,449,513

DUAL COMPLEMENTARY GATE KEYED AUTOMATIC GAIN CONTROL CIRCUIT

Paul Lawrence Jachim, Franklin Park, Ill., assignor to Motorola, Inc., Franklin Park, Ill., a corporation of Illinois Continuation-in-part of application Ser. No. 534,396, Mar. 15, 1966. This application Feb. 12, 1968, Ser. No. 704,622

Int. Cl. H04n 5/00

U.S. Cl. 178—7.3 8 Claims

ABSTRACT OF THE DISCLOSURE

A pair of amplifying devices control currents which are added differentially to develop an AGC signal. The amplifying devices are controlled by the amplitude of the sync pulses of the composite video signal with the sync pulses acting to close one amplifying device and open the other amplifying device according to the amplitude of the horizontal sync pulse. One amplifying device may have a gate in series therewith so that conduction of the gate takes place only during the duration of the horizontal sync pulse.

*Background of the invention*

Figure 1:
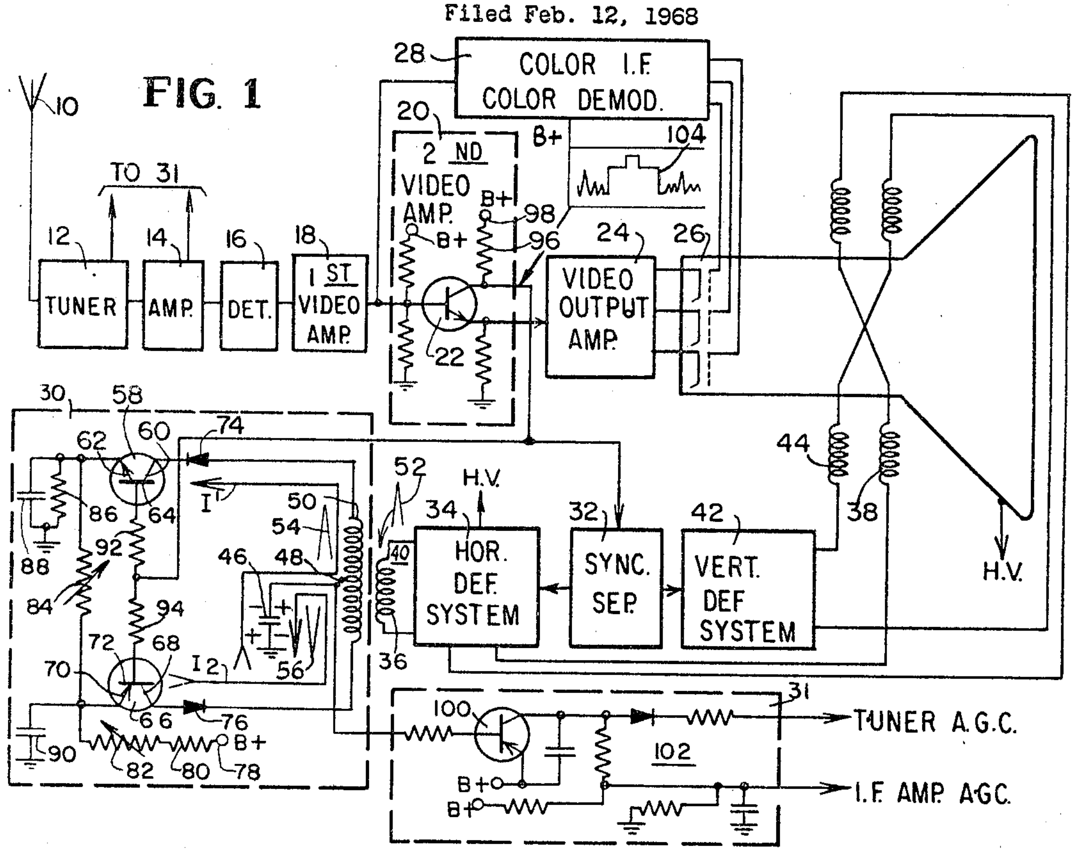

This application is a continuation-in-part of the application of Paul L. Jachim, Ser. No. 534,396, filed Mar. 15, 1966 and now abandoned.

If the amplitude of the demodulated composite video signal is allowed to vary over an excessive range, a strong incoming signal may cause the video amplifiers to become overloaded resulting in cross modulation and clipping of the synchronizing signal components while a weak incoming signal may cause the output of the video amplifier to be too low to provide proper picture reproduction. In addition, unwanted variations in contrast may result from a video signal which is changing in amplitude. To maintain the video signal relatively constant with variations in the level of the received television signal, an automatic gain control (AGC) circuit is commonly employed. The AGC function is generally accomplished by developing a control potential which is proportional to the strength of the incoming signal and is applied to one or more stages in the tuner and/or IF amplifier in a manner which decreases the gain as received signal strength increases. Since the composite video signal has a DC component which varies with the brightness of the scene being televised it would be undesirable to detect its average DC for AGC purposes. Instead a peak detector is utilized but because it is quite susceptible to noise, means are provided to gate the AGC circuit on during horizontal deflection pulses so that the peak of the composite video signal is sampled only during those periods. Thus, noise on the video can affect the operation of the AGC circuit only during a small percentage of the sweep time. It is desirable that the AGC circuit respond rapidly in order to follow fading caused, for example, by signal reflections from passing airplanes and to follow changes in the level of the received television signal when the tuned channel is changed from a strong incoming signal to a weak incoming signal and vice versa.

Prior art systems which have been directed to improving AGC response time have failed to provide isolation between the source of deflection pulses and the video amplifier with the result that some of the deflection pulses may mix with the video signal to produce improper picture reproduction. Also, the response by these AGC circuits to rapid changes in the level of the received television signal is not fast enough to maintain the signal at the output of the video amplifier constant. This is true because the charge-up time of the load capacitor, across which the AGC potential is developed, is proportional to its driving resistance which is a relatively high value load of the video amplifier. This poor response time causes the picture fading that the viewer observes on his television set when an airplane passes overhead.

*Summary of the invention*

Accordingly, it is an object of this invention to provide an improved AGC circuit in which there is sufficient isolation between the horizontal deflection system and the video amplifier so that horizontal deflection pulses are not mixed with the video signal.

Another object is to provide an AGC circuit in which the potential used to control the tuner and IF amplifier stages responds to rapid changes in the level of the received television signal fast enough to maintain the signal at the output of the video amplifiers relatively constant.

Figure 2:
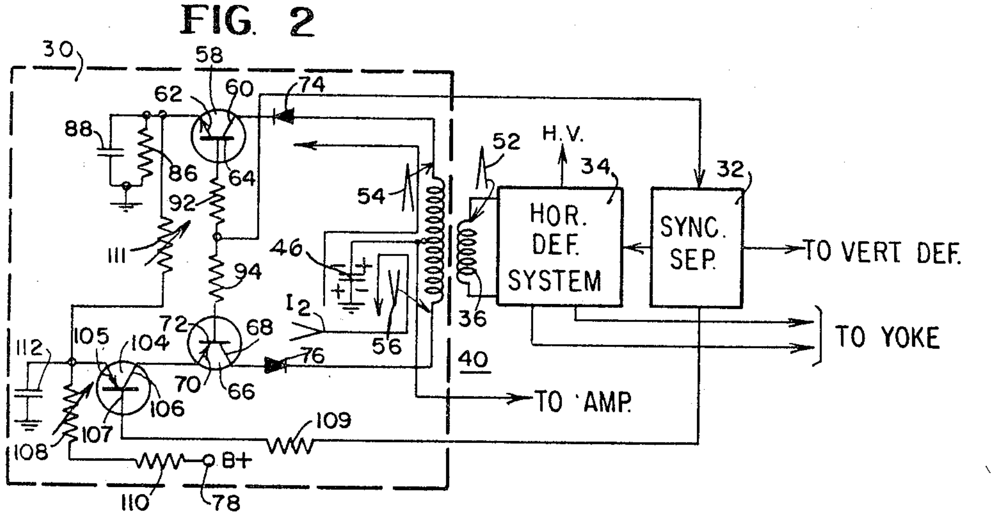

In the drawings:

FIG. 1 illustrates a diagram partially schematic and partially in block of a television receiver incorporating the invention; and FIG. 2 illustrates a second embodiment of the invention.

*Description of the invention*

In a specific embodiment of the invention, the output stage of the horizontal deflection system is coupled through a phase splitter to the collectors of a pair of complementary transistors, so that a positive polarity pulse gates the NPN transistor and a negative polarity pulse gates the PNP transistor. The video amplifier is coupled through an isolation network to each transistor base. A predetermined level of the composite video signal causes a first current to flow through the NPN transistor and a second current to flow through the PNP transistor. A change in the amplitude of the video signal from this predetermined level increases the current through one of the complementary pair and decreases the current through the other. A capacitor load connected from the phase splitter to ground is responsive to the first and second currents to produce a pair of voltages thereacross which differentially combine to provide a potential for controlling the gain of one or more amplifiers handling the received television signal.

Referring now to the drawing, the color television receiver therein shown includes tuner 12 to receive and frequency convert incoming color television signals appearing at antenna 10. The output intermediate frequency signal developed by tuner 12 is coupled through IF amplifier 14 to detector 16 to provide a demodulated composite video signal having luminance components, chrominance components and synchronizing components. The composite video signal is amplified in video amplifiers 18 and 20. The emitter of second video amplifier transistor 22 couples the luminance components through video output amplifier 24 to the multiple cathodes of cathode ray tube 26. First video amplifier 18 couples the chrominance components to the color IF and color demdulator combinatin 28 which separates the color information from the composite video signal to provide color difference signals which are applied to the multiple grids of cathode ray tube 26.

The demodulated television signal appearing at the collector of transistor 22 is DC coupled to AGC circuit 30 wherein a DC control potential indicative of the strength of the received television signal is developed. The control potential is coupled to low pass amplifier 31 where it is amplified and applied to the amplifying devices in tuner 12 and IF amplifier 14 for the gain regulation thereof. The demodulated television signal is also coupled to sync separator 32 which separates the synchronizing signal components from the composite video signal. The vertical synchronizing components are applied to the vertical deflection system 42, which develops and applies a sawtooth wave current signal to the magnetic deflection yoke 44 on the cathode ray tube 26 for vertical scanning. The horizontal components are applied to horizontal deflection system 34, which develops a suitable sawtooth scanning current in magnetic deflection yoke 38 for horizontal deflection as well as providing high voltage to the screen of cathode ray tube 26 and gating pulses across primary winding 36 of transformer 40 for AGC circuit 30.

The foregoing description is applicable to the television receiver in general terms. Since such operation is generally well known to those skilled in the art, further detailed discussion is believed to be unnecessary. The following discussion and description directly concerns the present invention in providing a fast acting automatic gain control circuit.

Transformer 40 couples the gating pulses from horizontal deflection system 34 to AGC circuit 30. Capacitor 46, connected to center tap 48 of secondary winding 50, is essentially a short circuit to the horizontal deflection frequency and hence center tap 48 is at AC ground. Primary winding 36 couples a positive polarity pulse 52 to secondary winding 50 and by well known phase splitter action a positive polarity pulse 54 appears at the top of the secondary winding 50 with reference to ground and a negative polarity pulse 56 appears at the bottom of secondary winding 50 with reference to ground. Secondary winding 50 is coupled to the collectors of a pair of complementary transistors, the positive polarity pulse 54 being coupled through diode 74 to NPN transistor 58 and the negative polarity pulse 56 being coupled through diode 76 to PNP transsistor 66. A DC energy source 78 provides bias for emitters 62 and 70 through the series combination of resistances 80, 82, 84 and 86 to ground. Capacitors 88 and 90 place emitters 62 and 70 respectively on AC ground to preclude AC degeneration. Resistors 92 and 94 provide isolation between transistors 58 and 66. Bases 64 and 72 are provided with a DC return through resistances 92 and 94 respectively through load resistor 96 of second video amplifier transistor 22 to DC energy source 98. An AGC potential is developed across capacitor 46 and is coupled to low pass amplifier circuit 31 which is capable of amplifying a DC voltage that may change in value as rapidly as a few hundred cycles per second when, for example, an airplane passes overhead. The output of transistor 100 is applied to isolation and divider network 102 to provide AGC voltage for amplifying stages in tuner 12 and in IF amplifier 14.

Considering now the operation of AGC circuit 30, pulses 54 and 56 appear each time the horizontal deflection system 34 develops a horizontal gating pulse 52. Pulses 54 and 56 are of the proper polarity to drive diodes 74 and 76 into conduction so that each is effectively short circuited during gating times. The purpose of these diodes is to block the ring caused by the horizontal yoke during retrace and prevent forward biasing the collector to base. Positive polarity pulse 54 appearing on collector 60 from NPN transistor 58 renders same conductive and likewise negative pulse 56 on collector 68 renders PNP transistor 66 conductive. Since the DC return for collectors 60 and 68 is through the base to emitter junction of transistor 100 to B+, the quiescent operating voltage at junction 48 will be slightly less than B+. With no video signal present, variable resistors 82 and 84 are set so that transistor 58 is cut off and transistor 66 is in saturation; that is, current $I_1$ flowing from ground through capacitor 46 through the collector to emitter junction of transistor 58 is approximately zero while a maximum current $I_2$ flows from the collector to emitter junction of transistor 66 down through capacitor 46 to ground. The respective polarities developed due to these currents are shown on capacitor 46. The positive voltage developed across capacitor 46 by the $I_2$ current adds to the quiescent operating voltage to provide a maximum positive control potential at junction 48.

When a television signal is received, a video signal 104 appears at the collector of second video amplifier transistor 22 and as shown extends in the positive direction. The positive synchronizing peaks are conducted through isolation resistors 92 and 94 to bases 64 and 72 respectively to increase the net positive voltage thereon. The resulting bias increase on NPN transistor 58 causes it to come out of cut-off so that $I_1$ is no longer zero but instead some finite value depending on the amplitude of video signal 104. The $I_1$ current flowing through capacitor 46 causes a negative voltage to appear thereacross which substracts from the maximum positive control potential. At the same time, the resulting bias decrease for PNP transistor 66 causes it to come out of saturation so that the $I_2$ current decreases to thereby further decrease the maximum positive control potential at junction 48.

An increase in amplitude of video signal 104 causes an additional increase in $I_1$ and an additional decrease in $I_2$ to thereby result in a further decrease in the positive control potential at junction 48. Carrying this analysis through, a sufficient amplitude of the video signal causes $I_1$ to be equal to $I_2$ so that the control potential is the quiescent operating voltage while further increases in signal strength eventually causes transistor 58 to become saturated so that $I_1$ becomes a maximum and causes transistor 66 to cut off so that $I_2$ is essentially zero to thereby provide a minimum positive control potential at junction 48. The control potential developed is coupled to low pass amplifier circuit 31 where it is amplified by transistor 100 and applied to the amplifying stages in tuner 12 and IF amplifier 14 through network 102.

The push-pull operation just explained gives a net positive control potential dependent on two factors; first, $I_2$ decreases as the signal level increases so that the voltage drop across capacitor 46 becomes less positive and secondly, $I_1$ increases as the signal level increases to provide a negative voltage across capacitor 46 to further decrease the net positive voltage at junction 48. The size of capacitor 46 should be large enough to maintain the charge placed thereon by $I_1$ and $I_2$ constant until the next horizontal synchronizing pulse appears, so that the control potential does not change markedly from that required for proper control. Preferably the bias on the complementary pair of transistors is set so that a received television signal of average strength causes a net zero voltage change from the quiescent operating voltage at junction 48. In such case a decrease in the signal strength provides an increase in the quiescent operating voltage to increase the gain of the amplifying stages in tuner 12 and IF amplifier 14 while an increase in the signal strength provides a decrease in the quiescent operating voltage to lower the gain of these stages.

The above described invention has several advantages. First, due to the inherent characteristics of a transistor, there is improved isolation between the second video amplifier and the horizontal deflection system so that the horizontal deflection components do not mix with the video signal to cause faulty picture reproduction. Because of the high resistance of the collector to base junction, currents $I_1$ and $I_2$ due to the horizontal deflection pulses flow through the collector to emitter junctions of transistors 58 and 66 respectively while a negligible amount of these currents flow to the bases where the video signal is present. Thus, the AGC circuit has the effect of keeping the two sources separate so that the horizontal deflection system pulses cannot mix with the video. Secondly, either sense of correction is available. What has been described is a control potential which decreases from a maximum positive value with increasing signal. The reverse, that is, an increase in the positive control potential for increasing signal can be obtained by utilizing a negative going video signal which is readily available at the output of first video amplifier 18 or by leaving out transistor 100 in low pass amplifier 31 or by adding a transistor in addition to transistor 100 to effect a 180 degree phase reversal. Thirdly, it is desirable that the AGC circuit react rapidly to the level of the received television signal which may change on the order of 200 cycles per second when, for example, an airplane passes overhead. A fast acting AGC, as described herein, reacts to these changes to continually reset the gains of the amplifying stages in the tuner and the IF amplifier so that the signal at the output of the video amplifiers is maintained relatively constant. The reason for this speed is as follows: in normal operation the amplitude of the composite video signal is such as to cause both transistors to conduct equally so that the control potential at junction 48 is at the quiescent operating volage (slightly less than B+ as explained previously). If there is a rapid increase in signal strength transistor 58 will approach saturation which causes its collector-to-emitter resistance to decrease sharply and since charge up time is proportional to the driving resistance, the $I_1$ current charges capacitor 46 quite rapidly to a negative voltage which subtracts from the quiescent operating voltage. When the signal level then falls rapidly due to the fast fading, the reverse process occurs in which case transistor 66 approaches saturation. Thus, with rapid fading the effective resistance of the collector to emitter junctions alternatively become small so as to effect fast charge up times and cause the positive control potential to change in the direction required to maintain a constant amplitude video signal. Fourthly, any change in the level of the video signal causes a much greater change in the $I_1$ and $I_2$ currents due to the fact that current amplification devices such as transistors are utilized. Thus a small change in the signal level effects a significant shift in the control potential.

Pulses 54 and 56 are of longer duration than the sync pulses applied to bases 64 and 72 of transistors 58 and 66. Since the normal bias applied to transistors 58 and 66 acts to bias transistor 58 to nonconduction and transistor 66 to conduction the transistors are nonsymmetrical in their action. For a period of time before and after the sync pulse transistor 58 is nonconductive while transistor 66 is conductive. This would not be a problem if the period of conduction before and after each sync pulse were constant as the setting of the AGC circuit would compensate for this. However, the horizontal sync pulses have a different pattern during the vertical blanking period as equalizing and vertical sync pulses are supplied during this period. Thus the conduction of transistor 66, before and after the sync pulse, is different during the vertical blanking period.

In order to compensate for the asymmetrical action of the transistors 58 and 66 the embodiment shown in FIG. 2 may be used. Portions of the circuit identical to FIG. 1 have the same reference numeral. Transistor 104 has its emitter 105 coupled to the supply voltage through resistors 108 and 110, and its collector 106 coupled to emitter 70 of transistor 66. Base 107 of transistor 104 is coupled to sync separator 32 through resistor 109 and receives anegative-going horizontal sync pulse from sync separator 32. Resistor 111 couples a bias current to transistor 58 and capacitor 112 bypasses emitter 105 of transistor 104.

In operation transistor 104 acts as a second gate in series with transistor 66. Since transistor 104 is only conductive during the sync pulse period no current can flow through transistor 66 except during the sync pulse period. Thus the action of transistors 104 and 66 in series is symmetrical to the action of transistor 58. That is, each of the transistors conducts only during the sync pulse period with the magnitude of the conduction of each transistor being controlled according to the amplitude of the horizontal sync pulse. Thus the differences between the normal horizontal sync pulses and the horizontal sync pulses during the vertical sync pulse period do not affect the AGC control voltage. The action of the remaining portions of the circuit in developing the AGC control voltage across capacitor 46 are the same as previously described.

I claim:

1. In a television receiver having a source of horizontal synchronization pulses and a source of composite video signal, an AGC circuit including in combination; a phase splitter coupled to the source of horizontal synchronization pulses having first, second and third terminals and responsive to said source of horizontal synchronization pulses to provide opposite polarity pulses on said first and second terminals, first and second amplifying devices each having first and second control electrodes, said first terminal coupled to said first control electrode of said first amplifying device, said second terminal coupled to said first control electrode of said second amplifying device, said pulses respectively gating said first and second amplifying devices on, means coupling the source of composite video signal to said second control electrodes, a predetermined level of the composite video signal causing a first current to flow through said first amplifying device and a second current to flow through said second amplifying device, a change in the amplitude of said composite video signal from said predetermined level causing one of said currents to increase and the other of said currents to decrease, capacitor means coupled between said third terminal and a point of reference potential, said capacitor means responsive to said first and second currents which differentially combine to provide a gain control potential.

2. The AGC circuit according to claim 1 in which said first amplifying device is an NPN transistor and said second amplifying device is a PNP transistor, said first and second electrodes being respectively a collector and a base.

3. The AGC circuit according to claim 1 in which said first amplifying device is an NPN transistor and said second amplifying device is a PNP transistor, said first and second electrodes being respectively a collector and a base, each of said amplifying devices also having an emitter, means to bias each of said emitters comprising a voltage divider network, the amount of said bias being such that when said composite video signal is not present said PNP transistor is in saturation and said NPN transistor is cut off and such that when the amplitude of said composite video signal is a maximum said NPN transistor is in saturation and said PNP transistor is cut off.

4. The AGC circuit of claim 3 and further including, a gate transistor coupled in series with said PNP transistor and normally biased to non-conduction, said gate transistor being adapted to receive said horizontal synchronization pulses and to be biased to conduction thereby, whereby current flows through said gate transistor and said PNP transistor only during the time a horizontal sync pulse is present.

5. An AGC circuit for a television receiver, including in combination, first and second amplifying devices, circuit means coupled to said first and second amplifying devices, said circuit means being adapted to receive a composite video signal including horizontal sync pulses and couple the same to said first and second amplifying devices for control of the conduction thereof, means for developing first and second gating pulses coupled to said first and second amplifiers, said first and second amplifying devices being responsive to said first and second gating pulses to become respectively conductive, whereby first and second currents respectively flow through said first and second amplifying devices, the magnitude of said first and second currents being dependent upon the amplitue of said composite video signal, and means coupled to said first and second amplifying means for differentially adding said first and second currents to develop an AGC control potential.

6. The AGC circuit of claim 5 wherein, said first amplifying device is a first transistor and said second amplifying device is a second transistor, with said first and second transistors being complementary, said first and second gating pulses are of opposite polarity, and said means for differentially adding said first and second currents is a capacitor.

7. The AGC circuit of claim 6 wherein, said first and second gating pulses are in synchronism with said horizontal sync pulses and further have a duration longer than said horizontal sync pulses, bias means coupled to first and second transistors to provide bias voltages therefor, said bias voltages acting to bias said first transistor to conduction and said second transistor to nonconduction with no composite video signal present, said composite video signal acting to bias said first transistor toward nonconduction and said second transistor toward conduction, and gate means coupled in series with said first transistor and adapted to receive said horizontal synchronizing pulses, said gate means normally being biased to nonconduction and being responsive to said horizontal synchronizing pulses to be biased to conduction, whereby said first current flows only during the duration of said horizontal synchronizing pulses.

8. The AGC circuit of claim 7 wherein, said first and second transistors each have collector electrodes coupled to said means for developing said first and second gating pulses and to said capacitor, base electrodes coupled to said circuit means, and emitter electrodes, said gate means includes a third transistor having a collector electrode coupled to the emitter electrode of said first transistor, a base electrode adapted to receive said horizontal synchronizing pulses, and an emitter electrode coupled to said bias means, said bias means further being coupled to said emitter electrode of said second transistor.

References Cited

UNITED STATES PATENTS

| | | | |
|---|---|---|---|
| 3,404,225 | 10/1968 | De Marinis et al. ---- | 178—7.3 |
| 2,609,443 | 9/1952 | Avins -------------- | 178—7.3 |

ROBERT L. GRIFFIN, *Primary Examiner.*

R. L. RICHARDSON, *Assistant Examiner.*

U.S. Cl. X.R.

307—255